United States Patent [19]

Sugimura

[11] Patent Number: 4,943,095
[45] Date of Patent: Jul. 24, 1990

[54] STEPPED THREAD AND CUTOFF THREAD JOINT EXHIBITING EXCELLENT FATIGUE RESISTANCE

[76] Inventor: Nobuyuki Sugimura, 308, Mabase, Shimizu-shi, Shizuoka-ken, Japan

[21] Appl. No.: 431,675

[22] Filed: Nov. 2, 1989

Related U.S. Application Data

[63] Continuation of Ser. No. 276,623, Nov. 28, 1988, abandoned.

[30] Foreign Application Priority Data

Mar. 4, 1988 [JP] Japan .................. 63-51316
Mar. 4, 1988 [JP] Japan .................. 63-51317

[51] Int. Cl.⁵ .......................................... F16L 25/00
[52] U.S. Cl. .................... 285/334; 285/390; 285/333
[58] Field of Search ............... 285/334, 333, 390, 355

[56] References Cited

U.S. PATENT DOCUMENTS

| | | | |
|---|---|---|---|
| 2,204,754 | 6/1940 | Frame | 285/334 |
| 2,772,102 | 11/1956 | Webb | 285/390 X |
| 3,050,318 | 8/1962 | Van Der Wissel | 285/334 |
| 3,467,413 | 9/1969 | Madrelle | 285/334 X |
| 4,113,290 | 9/1978 | Miida | 285/334 |
| 4,189,975 | 2/1980 | Nisida et al. | |
| 4,346,920 | 8/1982 | Dailey | 285/334 X |
| 4,521,042 | 6/1985 | Blackburn et al. | 285/334 |
| 4,549,754 | 10/1985 | Saunders et al. | 285/334 |
| 4,688,832 | 8/1987 | Ortloff et al. | 285/390 X |
| 4,730,857 | 3/1988 | Schwind | 285/390 |

Primary Examiner—Randolph A. Reese
Assistant Examiner—Carol I. Bordas
Attorney, Agent, or Firm—Wood, Phillips, Mason, Recktenwald & VanSanten

[57] ABSTRACT

A thread joint to be subjected to the fluctuating load having a thread to be subjected to the tensile load from which a thread crest contact surface is cut off from the threads thereof in the direction of the tensile load, and the contact height of the same is lowered with respect to the other portion. Therefore, the maximum bending moment per unit area generated at the root of the threads is uniformed and the peak bending moment per unit area is reduced.

10 Claims, 11 Drawing Sheets

STEPPED THREAD AND CUTOFF THREAD JOINT EXHIBITING EXCELLENT FATIGUE RESISTANCE

This application is a continuation of application Ser. No. 276,623, filed Nov. 28, 1988, now abandoned.

BACKGROUND OF THE INVENTION

Field of the Invention and Related Art Statement

This invention relates to a thread joint for use in the portions of an accumulator or a cylinder in which intense load changes occur and thereby causing repeated tensions to be applied to the thread joint, and, more particularly relates to a stepped thread joint and a cutoff thread joint exhibiting a long fatigue life.

For example, an accumulator, which acts as a fluid device, is constituted in such a manner that the inside portion of the main container body thereof is divided into a gas chamber and a fluid chamber by using a bladder therein and each of the two ends of the main container body is sealed by a side plate, whereby the accumulator performs a pulsation absorbing action or a shock absorbing action by way of expanding or contracting the bladder in accordance with the fluid pressure change in the fluid circuit. In such accumulators, a parallel thread is employed so as to act as a means for securing the main container body with the side plate.

When the internal pressure of the accumulator rises and the side plate is pressed outwards, the thread is repeatedly subjected to the axial and circumferential load, that is, a so-called fluctuating load from 0 to the maximum level. These loads are not uniformly borne by the ridges of the thread, but are set off in the direction of the tensile force.

Therefore, the root of the front end portion of a female thread to which a great tension is applied generates a stress concentration, which may cause this root to be broken.

In order to overcome the above-described problem, a thread joint can be employed which is "a thread joint utilizing male thread in the shape of the tapered tip thereof that can exhibit fatigue resistance" disclosed previously in U.S. Pat. No. 4189975 and Japanese Patent Publication No. 56-53651.

A group including the inventor of the present invention, as shown in FIG. 11, formed a female thread 2 of a main container body 1 and a male thread 4 of a side plate 3 each of which was in the form of a triangular thread M106.8 X 2. Then, a test accumulator having the male thread 4 which was so constituted that the height h of ridges $m_7$ to $m_1$ was gradually decreased in accordance with the description in the above-described patent and a conventional accumulator in which the above-described triangular thread was employed were manufactured. The load-bearing ratio of each of the threads of the accumulators and the fatigue life were then examined under conditions of: seal diameter d=104 mm; internal pressure p=0 to 318 kg/cm; and frequency 2.5 Hz.

As a result, although the test accumulator displayed rather more uniform load-bearing ratio than the conventional accumulator, the test accumulator displayed only a shorter fatigue life than the conventional accumulator.

The thread which bore the largest load-bearing ratio was the second ridge $m_2$ from the frontmost portion $2m$ in the test accumulator, the rate being 18.5%, while, in the conventional accumulator, it was the frontmost ridge, the rate being 21%. The fatigue life was, in the conventional accumulator, 560,000 times, while it was 380,000 times in the test accumulator.

When the load-bearing ratio of the thread is decreased, the fatigue life of the thread is usually lengthened. However, the fatigue life of the above-described test accumulator was shortened.

As a result of determining the cause, the peak bending moment of the maximum bending moments to be applied to the roots $f_1$ to $f_{10}$ respectively was applied to the root $f_2$ of the second female thread from the frontmost portion $2e$. The bending moment amplitude also becomes maximum, causing this portion to be broken. That is, when the male thread 4 is pressed in direction Y, each ridge fm of the female thread is brought into a cantilever state in which the lower surface thereof bears the distributed load. The height fh of the ridge fm of the female thread can be assumed to be the span which affects the size of the bending moment.

Therefore, in a case where the ridge height fh is made uniform, if the load to be borne by each ridge is not uniform, then the greater the load to be borne, the greater the peak bending moment. Furthermore, the bending moment amplitude reaches a maximum, and the thread can be easily broken. In other words, there is a maximum bending moment generated at each root of the female threads. The maximum bending moment per unit area is the maximum bending moment generated at a root of a female thread divided by the contact length of each female thread.

Each of the maximum bending moments per unit area generated at the root of the female thread of the conventional accumulator and the test accumulator was obtained by using the load-bearing ratio and the mean contact height. The result is shown in FIG. 4. In this figure, symbol A represents the maximum bending moment of the conventional accumulator, while symbol B represents that of the test accumulator. A peak bending moment PB of 13.5 kg mm/mm was generated at the root $f_2$ of the second female thread from the frontmost thread $2e$ of the test accumulator B. The thus-generated moment PB was larger than the peak bending moment PA=11.4 kg mm/mm of the conventional accumulator. Therefore, the moment amplitude was also great, causing the thread to be easily broken.

SUMMARY OF THE INVENTION

To this end, an object of the present invention is to improve the fatigue resistance of a thread joint and to lengthen the fatigue life of the same.

A thread joint which is to be subjected to a fluctuating load and which is joined according to the present invention comprises a stepped thread to be subjected to a tensile load from which each thread crest contact surface is cut off at the end portion of each of the threads and the contact height thereof is lowered with respect to the other portions, whereby the maximum bending moment per unit area at the root of the thread is uniformed, the peak bending moment per unit area is significantly reduced, and the bending moment amplitude is reduced for the purpose of preventing fatigue breakage. The term "stepped" means that the contact surfaces of the thread is made stair-stepped to terrace-shaped or in other words the crest heights are gradually decreased or reduced.

BRIEF DESCRIPTION OF THE DRAWINGS

FIGS. 1 to 10, each illustrating embodiments of the present invention, wherein

FIG. 1 is an enlarged vertical cross-sectional view of a stepped thread portion shown in FIG. 2;

FIG. 2 is a vertical cross-sectional view of an accumulator;

FIGS. 3 and FIGS. 5 to 7 are each an enlarged view illustrating the other embodiments of the stepped thread joint, and corresponding to FIG. 1;

FIG. 4 illustrates the relationship between each root and the maximum bending moment per unit area;

FIGS. 8 and 9 are enlarged cross-sectional views illustrating embodiments of a cutoff thread joint;

FIG. 10 illustrates the relationship between each root and the maximum bending moment per unit area.

DETAILED DESCRIPTION OF THE PREFERRED EMBODIMENT

An embodiment of the present invention will now be described with reference to the accompanying drawings.

Figure 2:
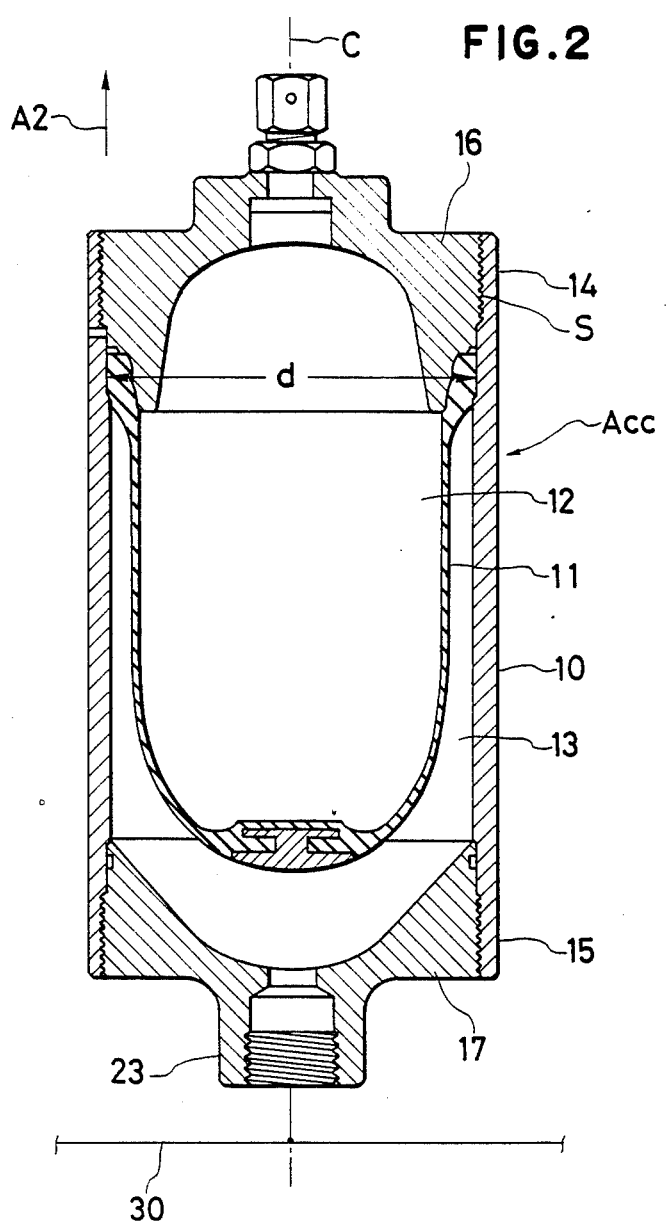

FIG. 2 is a vertical cross-sectional view of an accumulator ACC, in which the inside of a main container body 10 is divided into a gas chamber 12 and a fluid chamber 13 by a bladder 11, and two end portions 14 and 15 of this main container body 10 are respectively sealed by corresponding side plates 16 and 17.

Figure 1:
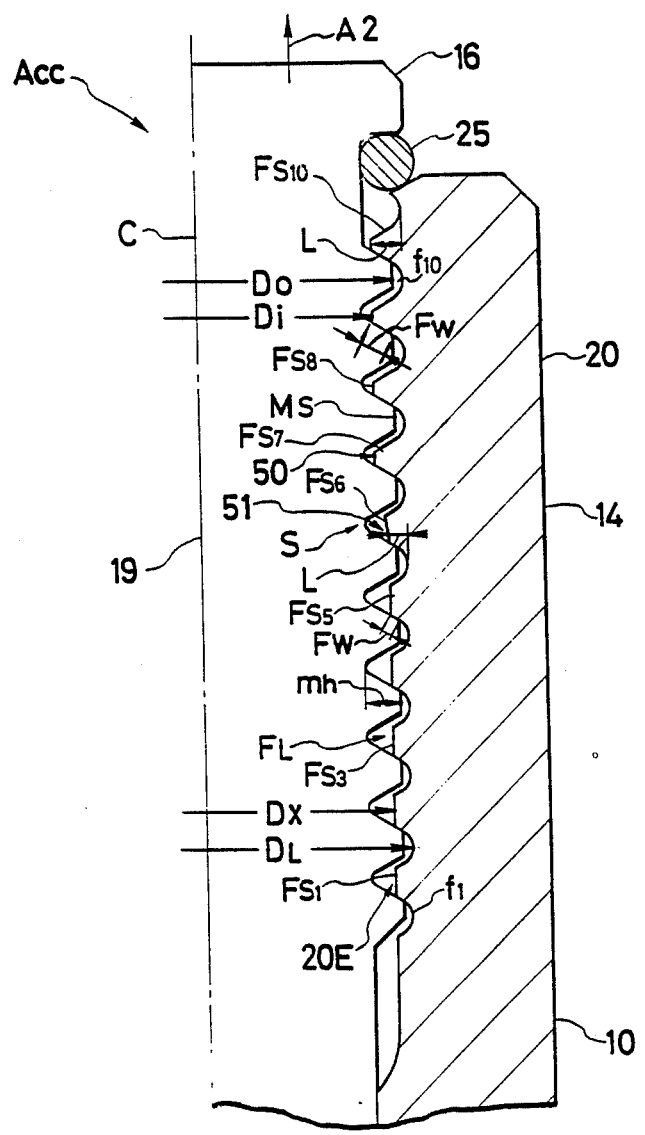

The two end portions 14 and 15 of this main container body 10 and the side plates 16 and 17 are secured to each other by means of threads of a thread portion S formed as shown in FIG. 1.

That is, the inside surface of the end portion 14 of the main container body 10 is formed a female thread 20 to be secured to a male thread 19 of the side plate 16.

This female thread 20 is provided with ten female ridges FS each contact height L of which is arranged in such a manner that: it is arranged to be a standard height from female threads $FS_{10}$ to $FS_7$ in a standard thread height portion 50 so that the portion where ridges FS to be brought into contact with ridges MS of the male thread, that is, the contact area FW of the female thread is made the same; while, in a stab thread portion FL from ridges $FS_5$ to $FS_1$, the threads are subjected to crest-cutting so as to make the contact height L lower than that of the above-described ridge $S_{10-7}$ in order to reduce the female contact area FW.

The crest portion of a ridge $FS_6$ of an intermediate thread portion 51 is lower than that of the ridges $FS_{10-7}$ of the standard thread portion 50, but higher than that of the ridges $FS_{5-1}$ of the stab thread portion FL for the purpose of making the maximum bending moment per unit area to be applied to this ridge $FS_6$ larger than that to be applied to the ridge FS of the standard thread portion 50, but smaller than the maximum bending moment to be applied to the ridges $FS_{5-1}$ of the stab thread portion FL.

Since the female thread 20 is formed as described above, the line connecting each crest of the ridge becomes a stepped form where the height of the ridges are gradually decreased from the ridge $FS_8$ to the ridge $FS_6$. Therefore, it becomes a so-called a stepped thread. The number of the ridges FS to be formed in this stab thread portion FL is defined as follows: assuming that the number of the threads to be fastened is N, the load Wx to be effected to the x-th ridge FSx counted in the thread tension direction is, $$Wx = W \times wNx \quad (1),$$

wherein
W: overall load
WNx: load-bearing ratio for the ridge FSx.

The maximum bending moment Mx per unit area to be applied to the root fx of the x-th thread at this time can be expressed by:

$$Mx = [(DL - D_0) + (D_0 - D)/2]/2 \times W \times wNx/(n \times DL) \quad (2),$$

wherein
DL: major diameter of the female thread
$D_O$: major diameter of the male thread
D: minor diameter Di of the female thread or the minor diameter Dx of the stab thread portion.

In this state, defining D=Dx so as to make Mx=the maximum bending moment $M_0$ per unit area of the root within the fatigue limit, the thread contact area FWx is obtained from:

$$FWx = (D_0^2 - Dx^2) \times \pi/4 \quad (3),$$

and the contact surface pressure Px per unit area is obtained from the contact area FW and the load Wx as follows:

$$Px = Wx/FWx \quad (4).$$

Then, using Equation (1), load $W_1 = W \times wN_1$ to be applied to the first ridge $FS_1$ is obtained, and the bending moment $M_1 = [(DL - D_0) + (D_0 - D)/2]/2 \times W \times wN_1/(\pi \times DL)$ at this time is obtained using Equation (2).

At this time, D=Dx is obtained so as to make the maximum bending moment $M_1$ per unit area = maximum bending moment M per unit area, and the thread contact area $FW_1 = (D_0^2 - Dx^2) \times \pi/4$ is obtained by using Equation (3), and the contact area $P_1 = W_1/FW_1$ is obtained by using Equation (4).

In a case where $P_1 <$ material tensile strength $\sigma_B$, load $W_2 = W \times wN_2$ to be applied to the second ridge $FS_2$ is obtained by using Equation (1), and the thus-obtained result is substituted into Equation (2). Simultaneously the maximum bending moment $M_{2i}$ per unit area in a case where D is the standard minor diameter $D_i$ of the female thread and the maximum bending moment $M_{2x}$ per unit area in a case where the same is the minor diameter Dx of the stab thread portion are respectively obtained.

Then, that satisfying the fact that [maximum bending moment $M_2$ per unit area] < [maximum bending moment Mo per unit area], for example, the minor diameter Dx of the maximum bending moment $M_{2x}$ per unit area is employed.

The above-described procedure is repeated until the employed minor diameter becomes the standard minor diameter Di of the female thread. Since, if $P_1 > \sigma_B$ the thread generates plastic deformation, the first ridge $FS_i$ only bears load of $FW_1 \times \sigma_B$ although load of $W_1 = W \times wN_1$ is effected to the same.

Therefore, the load $W_2$ applied to the next ridge $FS_2$ becomes $(W - FW_1 \times \sigma_B) \times w(N-1)_1$.

The load $W_2$ at this time is substituted into Equation (2), and simultaneously, the maximum bending moment $M_{2i}$ per unit area in a case where D is the standard minor diameter $D_i$ of the female thread and the maximum bending moment $M_{2x}$ per unit area in a case where the same is the minor diameter Dx of the stab thread portion are respectively obtained, and then, the above-described procedure is conducted so as to define the number of threads in the stab thread portion.

The roots $f_1$ to $f_{10}$ of the female thread are formed in a circular arc shape, and its radius fr is in the size of 0.1 to 0.18 times the pitch thereof. The height mh of each of the ridges of the male thread 19 is arranged to be a standard value. Reference numeral 25 represents a stopper for preventing excessive thread drive and symbol C represents a center line.

Next, an operation of this embodiment will be described.

When the fluid pressure in a fluid pressure circuit 30 is changed and the liquid is obliged to be introduced from a supply/delivery port 23 into an accumulator ACC, the bladder 11 is compressed and the pressure in the gas chamber 12 is raised, causing for the side plate 16 to be pressed in the direction designated by an arrow A2.

As a result of this, the male thread 19 is also pressed in the same direction, causing for the female thread 20 which is engaged with the former is also applied with a load. Therefore, each of the ridges $FS_1$ to $_{10}$ is applied with distributed loads $W_1$ to $W_{10}$.

If the thus-applied load is too large, the ridge FS generates a deformation within an elastic limit thereof and a plastic deformation, and the pitch thereof changes. However, the actual load to be borne by each ridge FS is limited to the force within the elastic limit.

The intensity of this force is limited in accordance with the size of the female thread contact area FW. Since the higher the contact height L of the ridge FS becomes this contact area FW becomes larger, the contact area FW of the ridges $FS_{6-1}$ in the stab thread portion FL becomes smaller than that of the ridges $FS_{10-8}$.

The contact height L of each ridges $S_{10-1}$ of the female thread is arranged so as to make the maximum bending moments per unit area generated in each root $f_{10-1}$ substantially the same.

Therefore, the peak bending moment PC per unit area and the bending moment amplitude generated in the root of the front end portion 20E of the female thread are successively reduced with respect to the female thread of the conventional accumulator. Therefore, the fatigue life can be lengthened.

Figure 4:
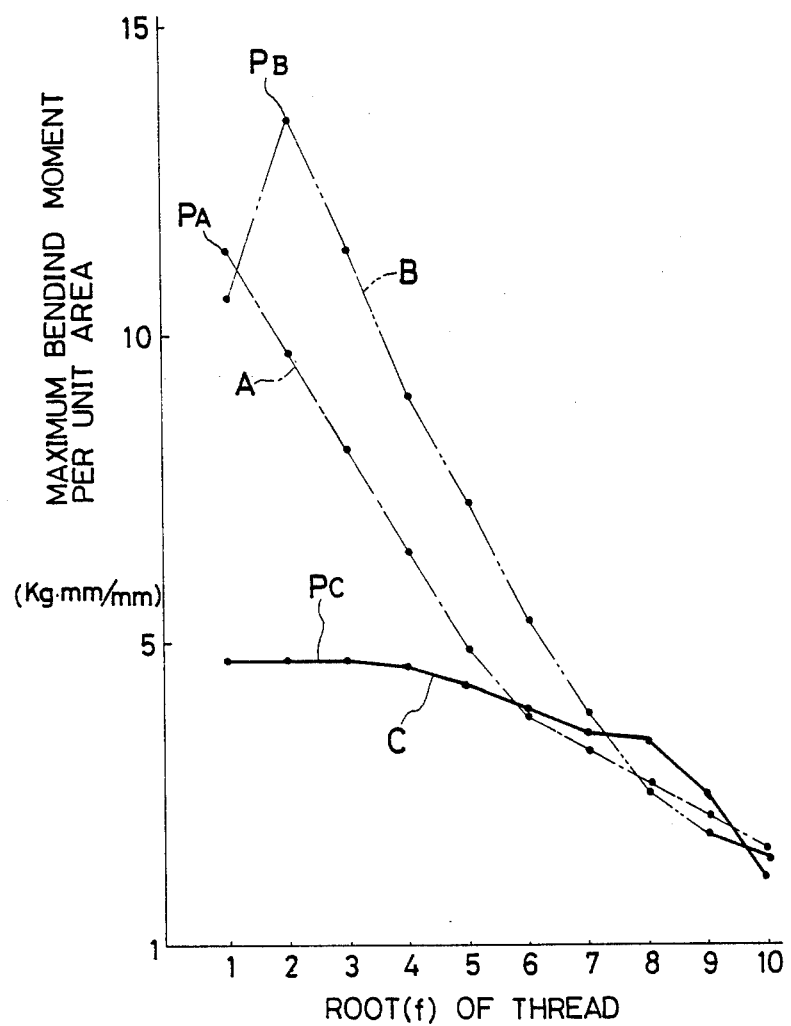

For example, when an accumulator which employed the thread according to the present invention was manufactured and the maximum bending moment per unit area generated in the root $f_{1-10}$ of the female thread and the fatigue life of the thread were examined under similar conditions as the above-described test, the resulted maximum bending moment per unit area was as shown by a curve C of FIG. 4. The peak bending moment PC per unit area was 4.7 kg mm/mm, and the fatigue life test result exceeded 10,000,000 times which exhibits 20 time or more that of the conventional accumulator.

This invention can, of course, be applied to a square thread, rounded thread, and a trapezoid thread and so forth.

Figure 3:
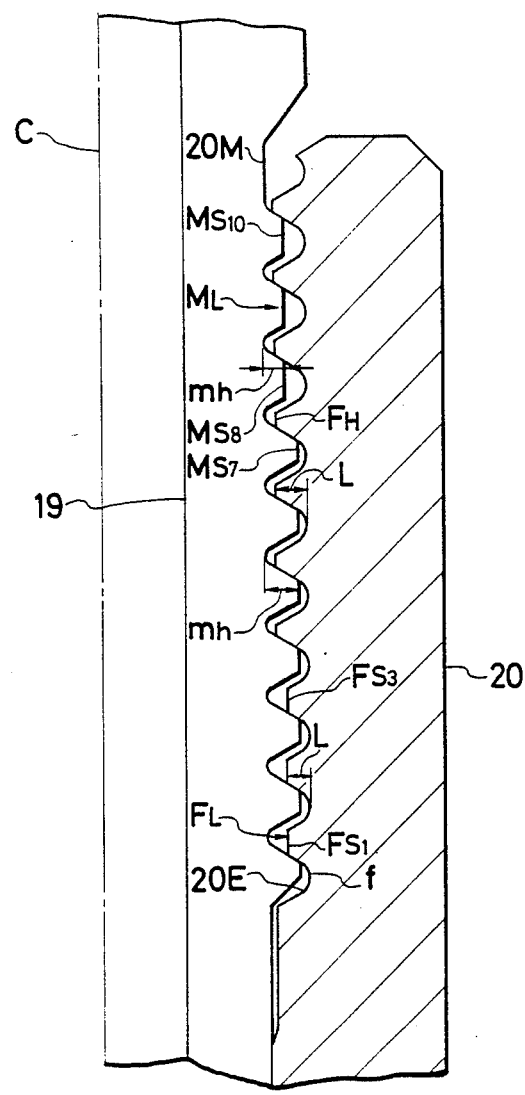

In a case where the tension is applied to the two ends of the thread, the structure may be, as shown in FIG. 3, formed in such a manner that: the ridges $FS_{1-3}$ of an end portion 20E of the female thread 20 are crest-cut at the same height to form the stab thread portion FL in order to make the contact height of this female thread 20 stepped shape; and the ridges $MS_{10-8}$ at the end portion of the male thread 19, that is the portion opposing the other end portion of the female thread 20 are crest-cut at the same height to form the stab thread portion ML in order to form this male thread 19 in a stepped shape.

Figure 5:
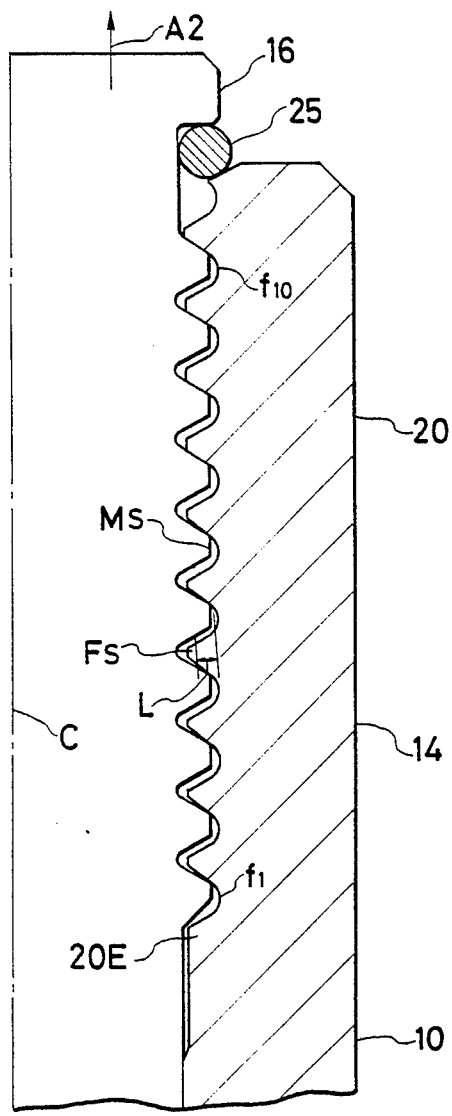

As an alternative to lowering the contact height of the thread by crest-cutting, the contact surface at the crest portion of the female thread FS may be, as shown in FIG. 5, cut so as to lower the contact height L of the female thread.

Figure 6:
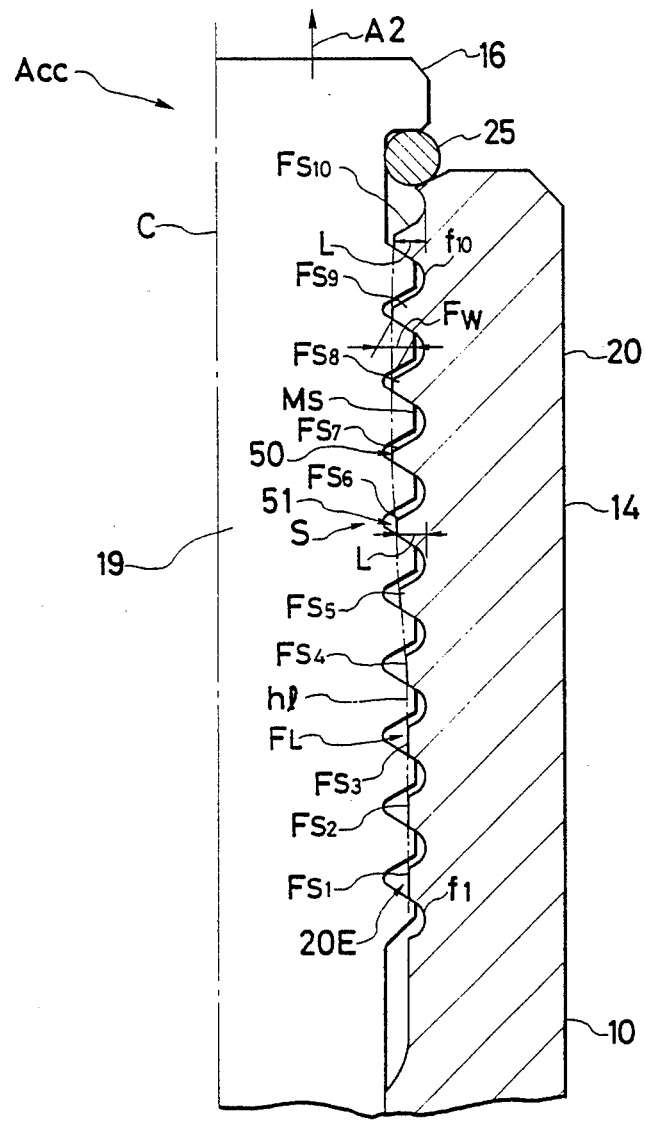

As shown in FIG. 6, the structure may be formed in such a manner as shown in FIG. 6 that the ridges $FS_{10-7}$ of the female thread 20 are arranged to be the standard height to form the standard crest portion 50, the ridges $FS_{3-1}$ of the female thread are is crest-cut at the same height to form the stab thread portion FL, and the ridges $FS_{6-4}$ of the female thread is made the intermediate crest portion 51.

Each crest of the intermediate crest portion 51 of the female thread is positioned on an oblique line hl connecting the crest of the ridges $FS_7$ and $FS_3$ of the female thread.

Figure 7:
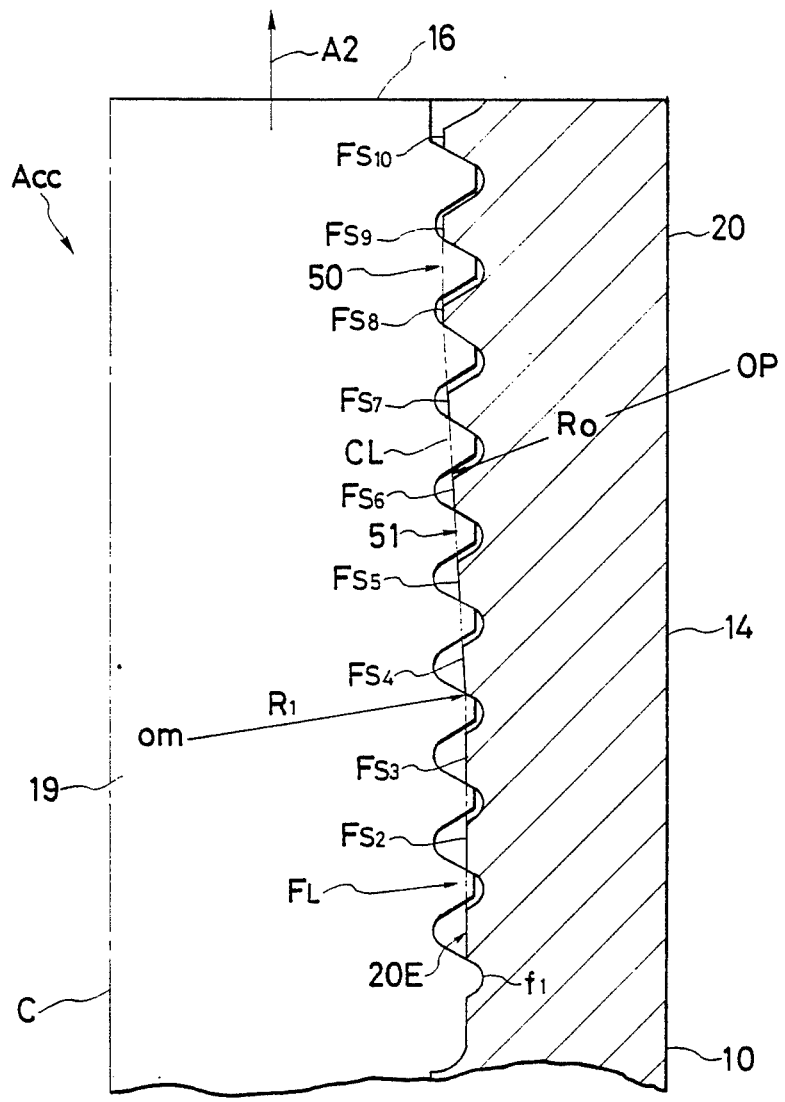

FIG. 7 illustrates an modified example of the thread shown in FIG. 6.

The structure may be formed in such a manner that the intersection between the ridges $FS_{10-8}$ in the standard thread portion of the female thread and the intermediate thread portion 51 is positioned on a tangent with a radius $R_0$ having the center OP thereof in the female thread 20, and the intersection between the ridges $FS_{1-3}$ of the stab thread pOrtion FL of the female thread and the intermediate thread portion 51 is positioned on a tangent with a radius $R_1$ having the center Om thereof in the male thread.

Figure 8:
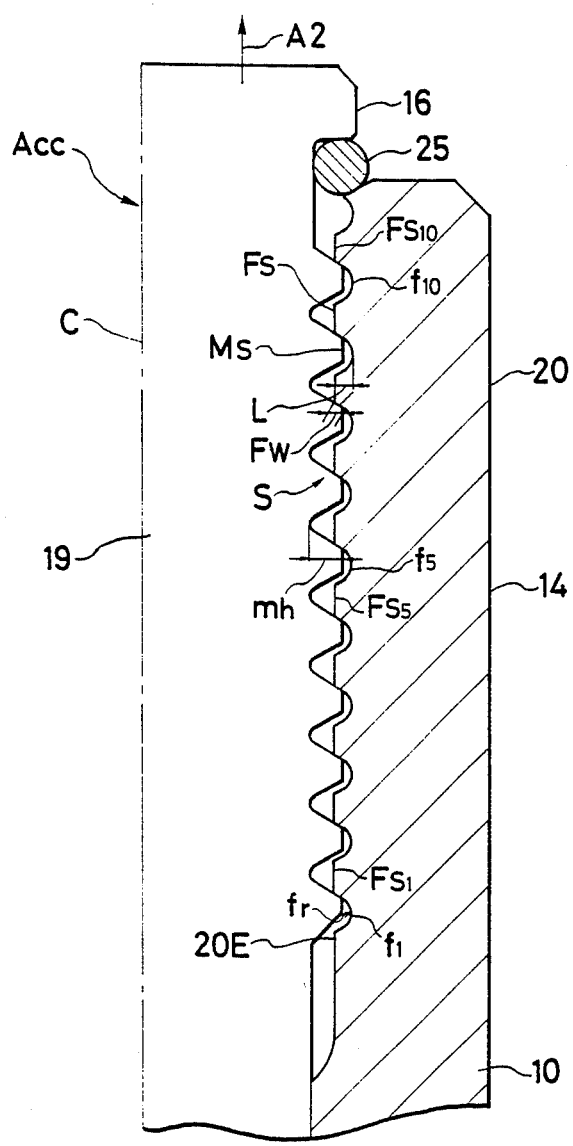

Furthermore, the female thread 20 may be formed in such a manner that, as shown in FIG. 8, all of the threads are crest-cut at the same height so as to cut off the crest contact surface and to make the contact heights of all of the threads are made the same for the purpose of making the portion where the ridge FS of the female thread are brought into contact with the ridges MS of the male thread, a so-called contact area of the female thread the same.

In this case, the actual load borne by each of the threads becomes completely uniformed regardless of the joining position ad the fastening position, and the maximum bending moment per unit area generated in the root of the thread becomes substantially the same.

Therefore, since the peak bending moment per unit area and the bending moment amplitude generated in the root of the thread can be reduced in comparison to the conventional example, the fatigue resistance can be improved and fatigue life can be lengthened.

Figure 10:
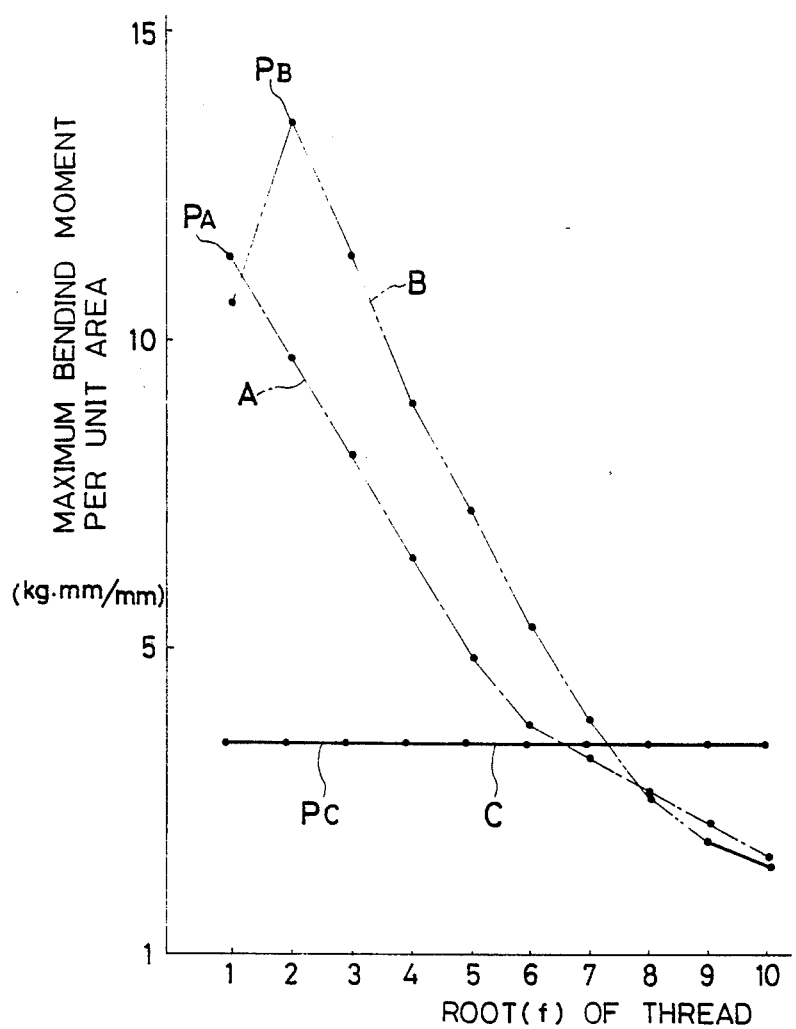
Figure 11:
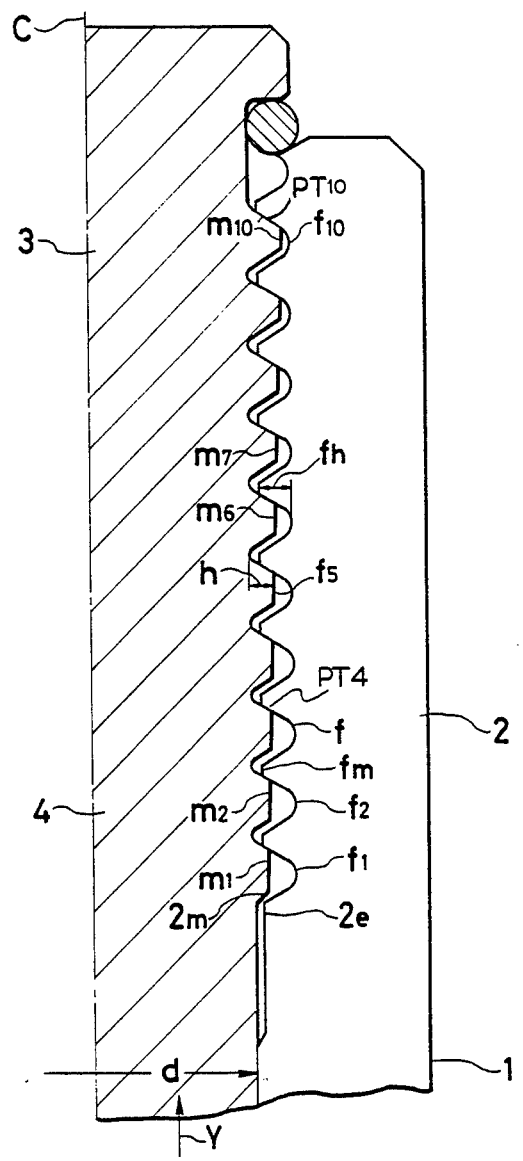
FIG. 11 illustrates a part of an enlarged cross-sectional view of a conventional example.

When an accumulator in which the above-described type cut off thread was manufactured and the maximum bending moment per unit area generated in the roots $f_{1-10}$ of the female thread and the fatigue life were tested under the same conditions as those for the above-described test, the maximum bending moment per unit area resulted as shown by a curve C of FIG. 10 and the peak bending moment PC per unit area was 3.482 kg mm/mm, and the fatigue life test resulted 10,000,000 times or more which is the 20 times the conventional accumulator.

Figure 9:
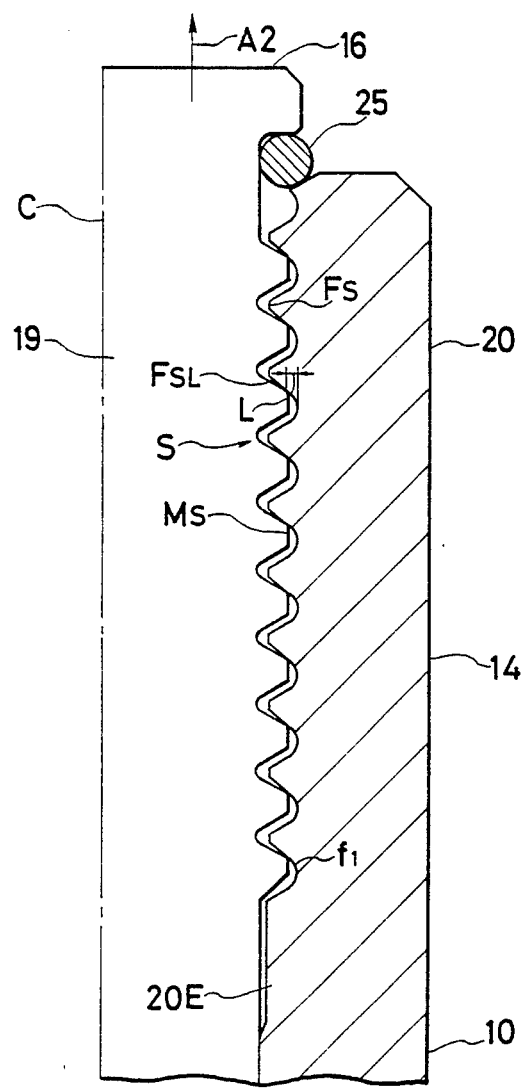

As an alternative to the crest-cutting all of the female threads at the same height, the crest contact surface FSL of the thread may be, as shown in FIG. 9, cut so as to make the female thread contact height L the same.

A female thread of the type described above exhibits an excellent fatigue resistance as a thread used in a movable portion or a fixing thread against movement of parts.

Although omitted from illustration, when tensile load is applied to the male thread, the above-described description for the male thread and the female thread may by be used in a reversed manner.

What is claim is:

1. A thread joint between a vessel main body and a vessel closure plate, said main body being subjected to varying internal pressure to subject said joint to a fluctuating load, said joint comprising a first thread on said main body and a second thread on said closure plate, said first and second threads each having crests and roots and being threadably matable to join said main body and said closure plate,
    wherein said first thread has
        a variable height crest along its length such that a line connecting said crests is in stair-stepped form, and
        a substantially uniform diameter of its root;
    whereby the stresses along the root of first thread are substantially uniform when said thread joint is subjected to said load.

2. The thread joint of claim 1, wherein the first thread is the female thread and the substantially uniform stresses along its root are a result of a substantially uniform maximum bending moment per unit area.

3. The thread joint of claim 1, wherein the first thread is in a substantially uniform spiral along its length except for its variable height crest.

4. A thread joint between a vessel main body and a vessel closure plate, said main body being subjected to varying internal pressure resulting in subjecting said joint to a fluctuating tensile load, said joint comprising a first thread on said main body and a second thread on said closure plate, said first and second threads each having crests and roots and being threadably matable to join said main body and said closure plate,
    wherein the crest of said first thread has surfaces for matably contacting said second thread, said first thread crest contact surfaces are successively reduces such that a line connecting said crests is in a stair-stepped form; and
    the diameter of each root of said first thread is substantially equal;
    whereby the stresses along the roots of said first thread are substantially uniform when said thread joint is subjected to said load.

5. A stepped thread joint between a vessel main body and a vessel closure plate, said main body being subjected to varying internal pressures and therefore subjecting said joint to fluctuating loads, said joint comprising:
    a first thread on said main body and a second thread on said closure plate, said first and second threads each having corresponding crests and roots, said crests of said first thread having surfaces for matably contacting corresponding crests of said second thread to join said main body and said closure plate,
    wherein said first thread has a stabbed thread portion, an intermediate thread portion and a standard thread portion in succession along said first thread,
    said first thread having its crest contact surfaces reduced such that a line connecting ends of each crest of said first thread is in stair-stepped form;
    the diameter of each root of said first thread being equal;
    such that the maximum bending moment per unit area generated at each root of said first thread is substantially uniform when said first thread is subjected to said fluctuating load.

6. A stepped thread joint exhibiting an excellent fatigue resistance, said stepped thread joint being joined in a threaded manner to close a vessel main body having varying internal pressure and said thread joint being subjected to fluctuating tensile load, said thread joint comprising:
    a first thread of said thread joint being subjected to the tensile load, said first thread having roots and crests, said crests having surfaces for matably contacting a second thread of said thread joint, said thread crest contact surfaces being reduced such that a line connecting ends of each crest of the thread is in stair-stepped form;
    the diameter of each root of said first thread being substantially equal;
    such that the maximum bending moment per unit area generated at each root of said first thread is substantially uniform when said first thread is subjected to said tensile load.

7. A stepped thread joint exhibiting an excellent fatigue resistance, said stepped thread joint being joined in a threaded manner to close a vessel main body having varying internal pressure and said thread joint being subjected to fluctuating tensile load, said thread joint comprising:
    a first thread of said thread joint being subjected to the tensile load and having a stab thread portion, an intermediate thread portion and a standard thread portion in succession along said first thread;
    said first thread having roots and crests, said crests having surfaces for matably contacting a second thread of said thread joint;
    said first thread of said thread joint having its thread crest contact surfaces reduced such that a line connecting ends of each crest of said first thread is in stair-stepped form;
    the diameter of each root of said first thread being equal;
    such that the maximum bending moment per unit area generated at each root of said first thread is substantially uniform when said first thread is subjected to said tensile load.

8. The stepped thread joint according to claim 7 wherein each contact height of said stab thread portion and said intermediate thread portion is reduced by crest-cutting.

9. The stepped thread joint according to claim 7 wherein each contact height of the threads of said stab thread portion and said intermediate thread portion are reduced by cutting the crest contact surface of each of said threads.

10. The stepped thread joint according to claim 7 wherein the contact height of said threads in said intermediate portion is lower than that of said standard thread portion, but higher than that of said stab thread portion.

* * * * *